(No Model.) 9 Sheets—Sheet 1.
E. F. WHITE.
MANUFACTURE OF FLOWERS OF SULPHUR.

No. 443,629. Patented Dec. 30, 1890.

Witnesses
Will A. Courtland
Nellie L. Pope

Inventor
Edward F. White
By his Attorney
Edward P. Thompson (No Model.)
9 Sheets—Sheet 2.

E. F. WHITE.
MANUFACTURE OF FLOWERS OF SULPHUR.

No. 443,629. Patented Dec. 30, 1890.

Witnesses
H. N. Courtland
Nellie L. Pope

Inventor
Edward F. White
By his Attorney
Edward P. Thompson (No Model.) 9 Sheets—Sheet 3.
E. F. WHITE.
MANUFACTURE OF FLOWERS OF SULPHUR.
No. 443,629. Patented Dec. 30, 1890.

WITNESSES
Will A. Courtland
Nellie L. Pope

INVENTOR
EDWARD F. WHITE
BY HIS ATTORNEY
Edward P. Thompson

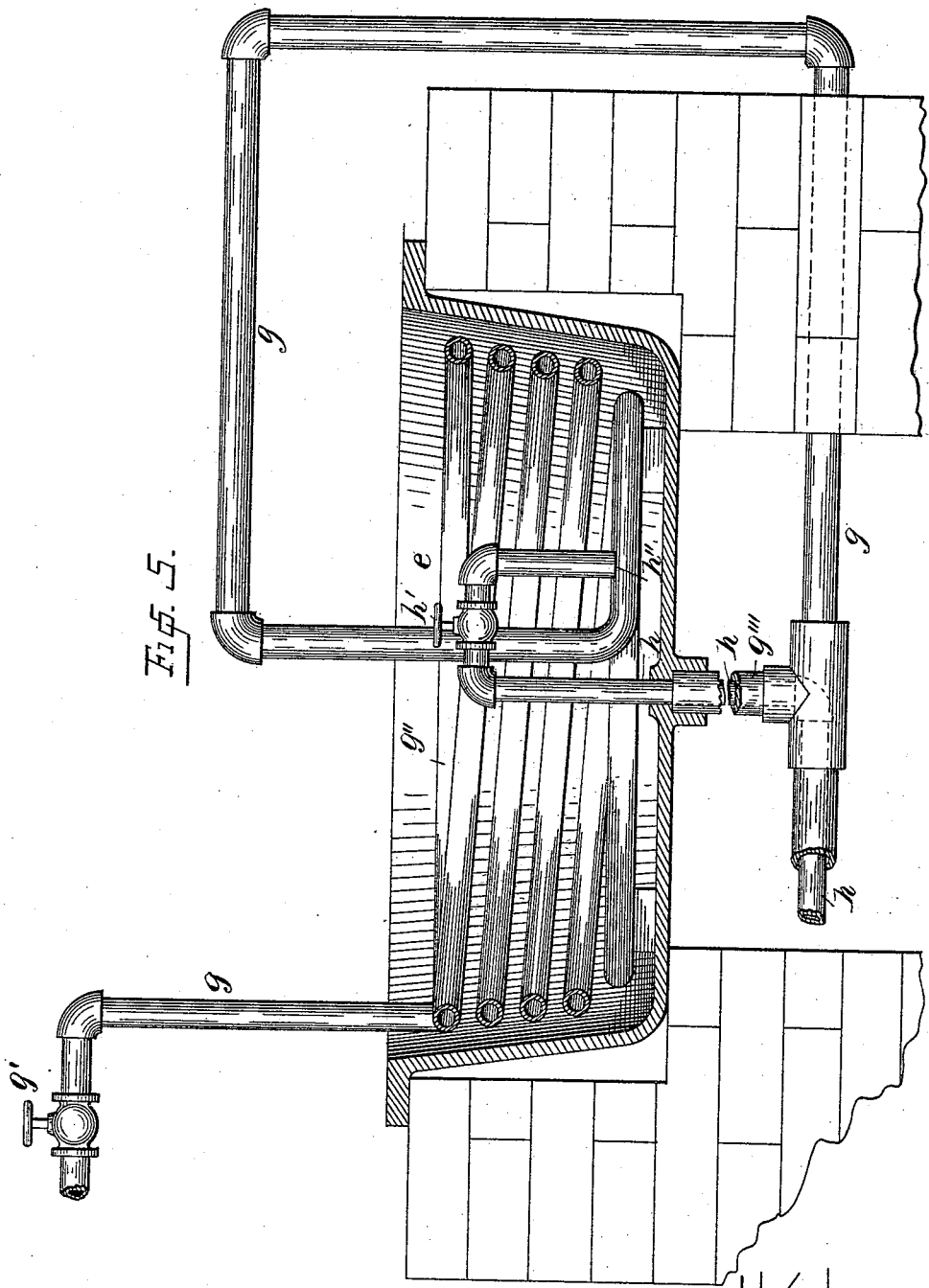

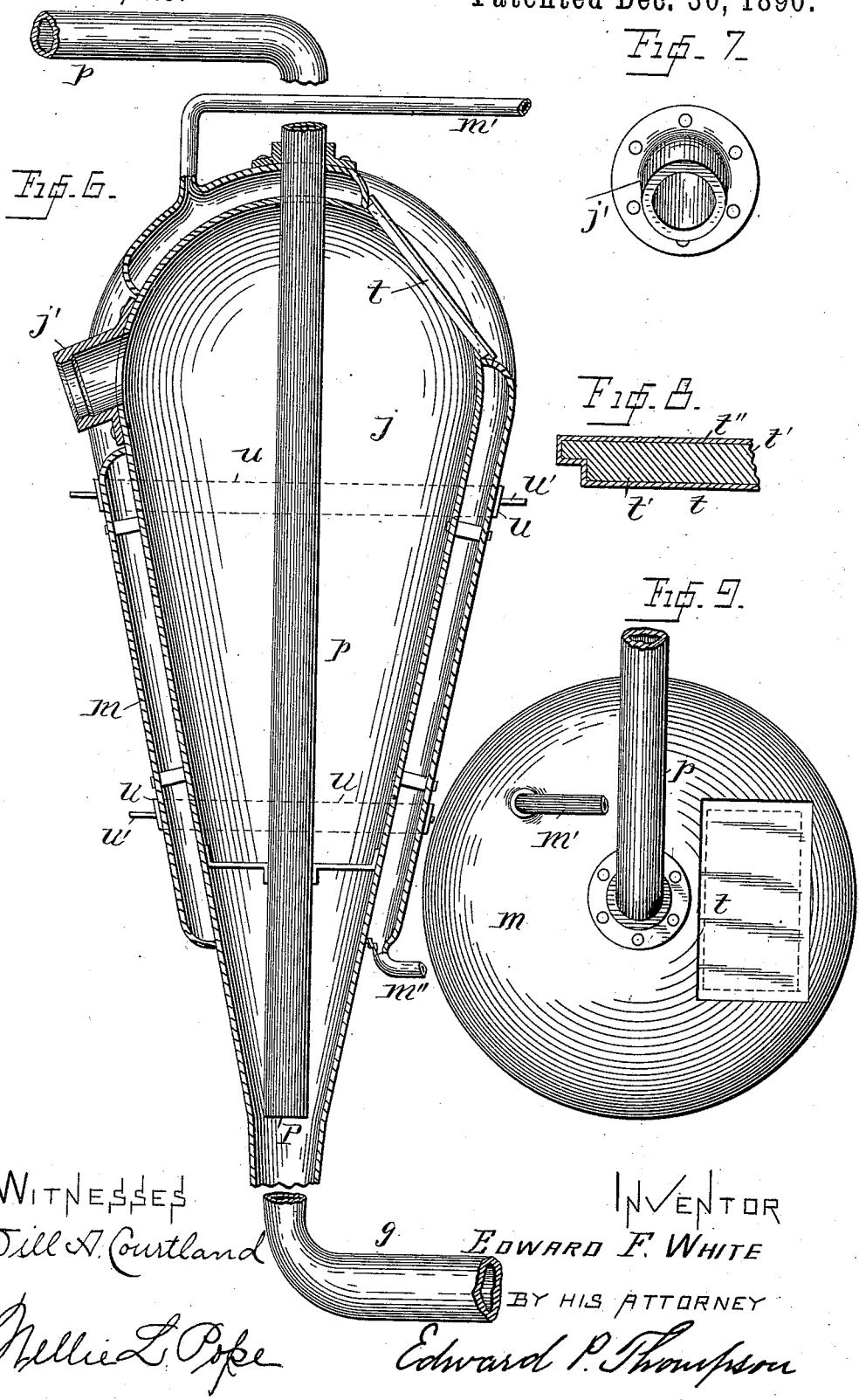

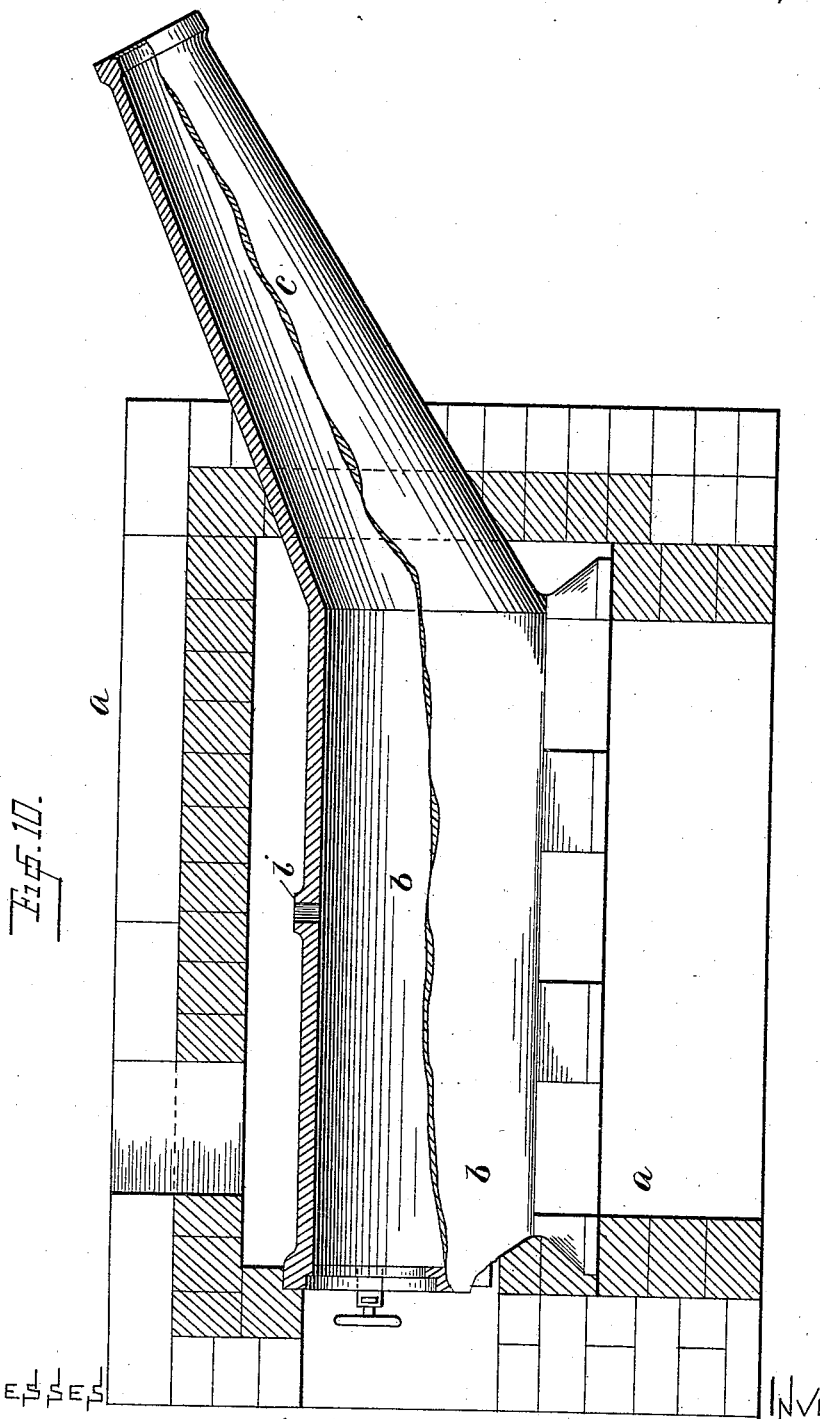

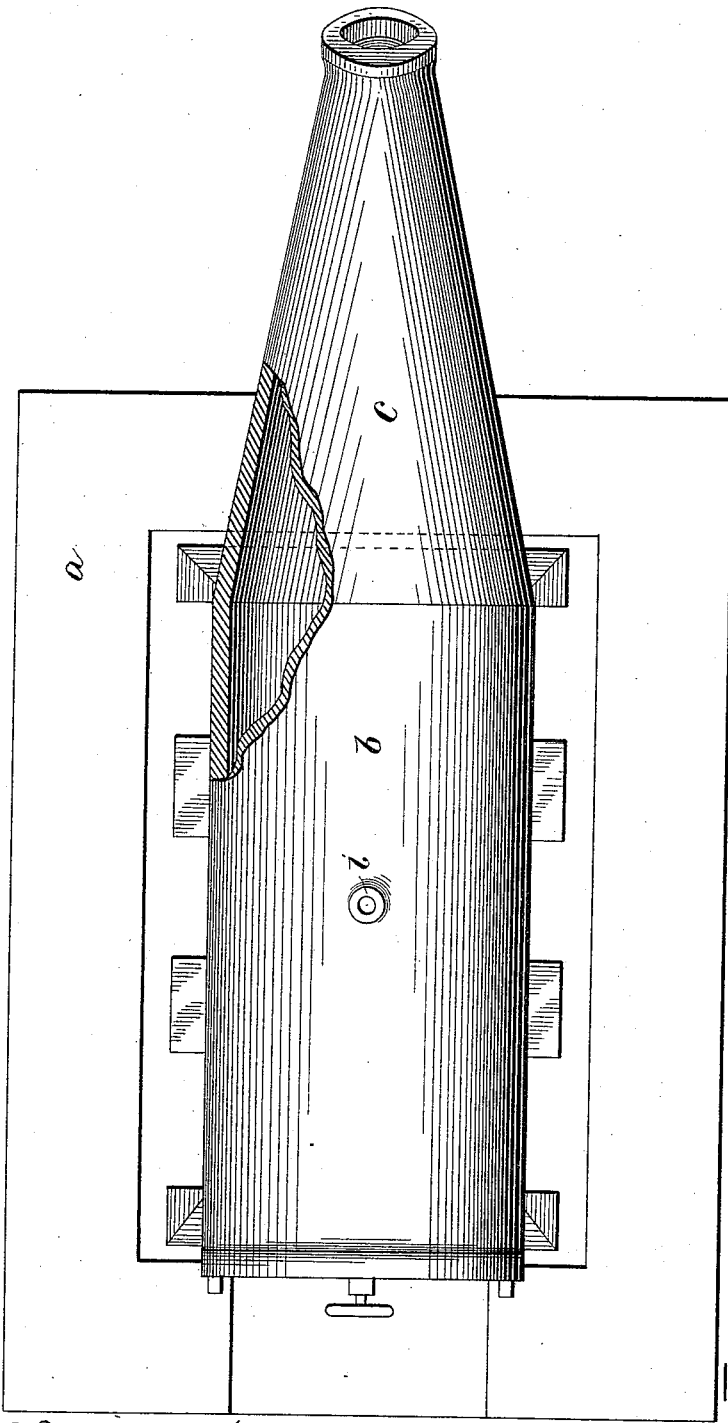

(No Model.) 9 Sheets—Sheet 8.
E. F. WHITE.
MANUFACTURE OF FLOWERS OF SULPHUR.
No. 443,629. Patented Dec. 30, 1890.

Witnesses
Will. H Courtland
Nellie L Pope

Inventor
Edward F White
By his Attorney
Edward P Thompson (No Model.)

E. F. WHITE.
MANUFACTURE OF FLOWERS OF SULPHUR.

No. 443,629. Patented Dec. 30, 1890.

Witnesses
Will A Courtland
Nellie L Pope

Inventor
Edward F. White
By his Attorney
Edward P. Thompson

UNITED STATES PATENT OFFICE.

EDWARD F. WHITE, OF BERGEN POINT, NEW JERSEY.

MANUFACTURE OF FLOWERS OF SULPHUR.

SPECIFICATION forming part of Letters Patent No. 443,629, dated December 30, 1890.

Application filed March 14, 1890. Renewed November 26, 1890. Serial No. 372,600. (No specimens.)

*To all whom it may concern:*

Be it known that I, EDWARD F. WHITE, a citizen of the United States, and a resident of Bergen Point, county of Bergen, and State of New Jersey, have invented certain new and useful Improvements in Manufacturing Flowers of Sulphur, of which the following is a specification.

My invention relates to the apparatus and method for the manufacture of the commercial product known as "flowers of sulphur."

The object of the invention is, primarily, to cheapen the manufacture by making the method or process continuous and unusually rapid.

The invention is described in all its details by reference to the accompanying drawings.

Figure 1:
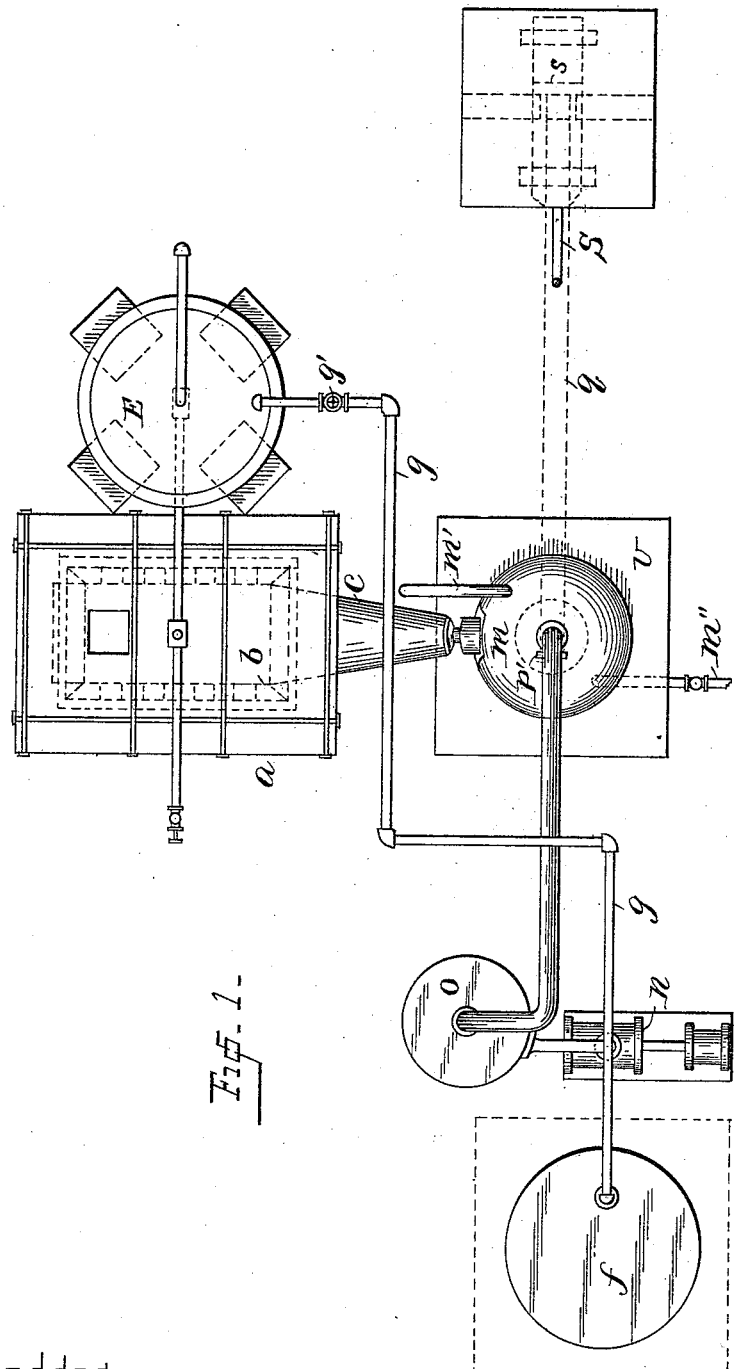
Figure 2:
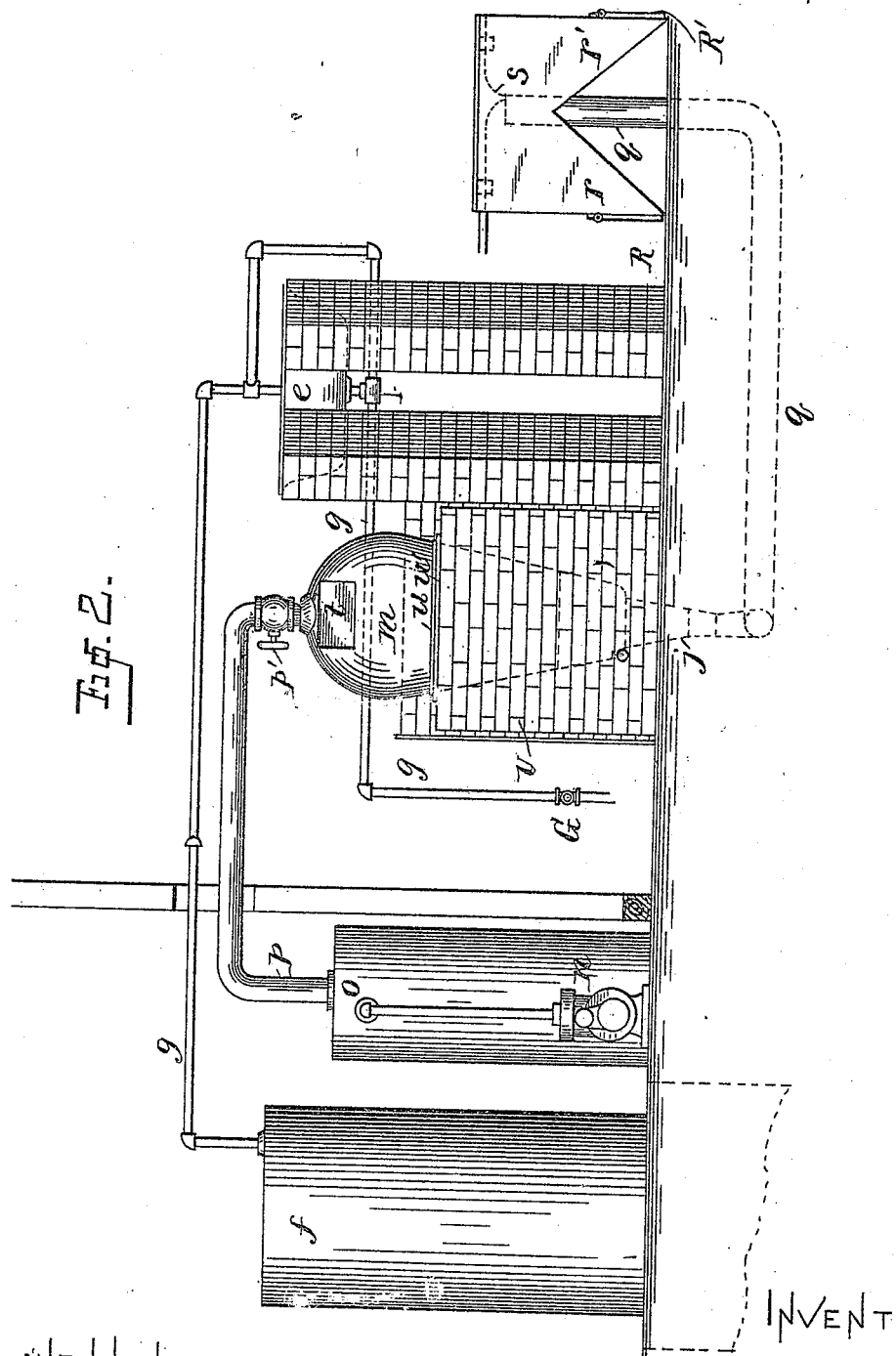
Figure 3:
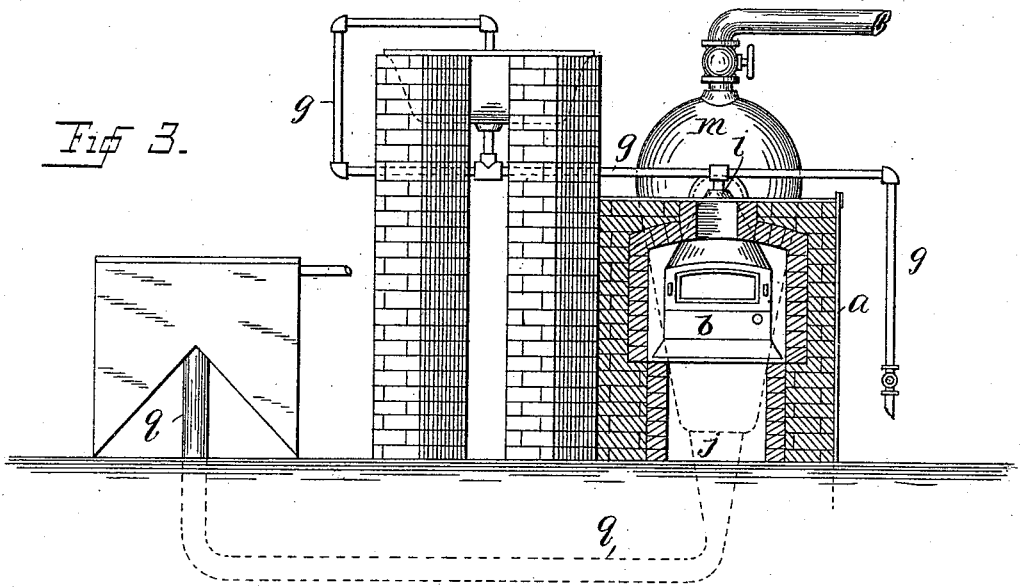
Figure 4:
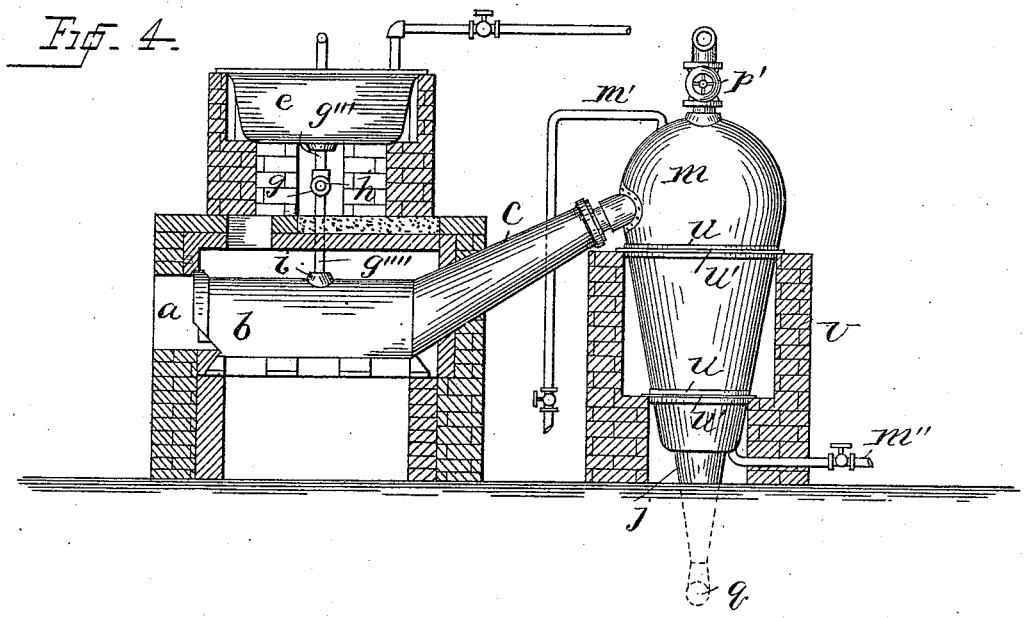
Figure 12:
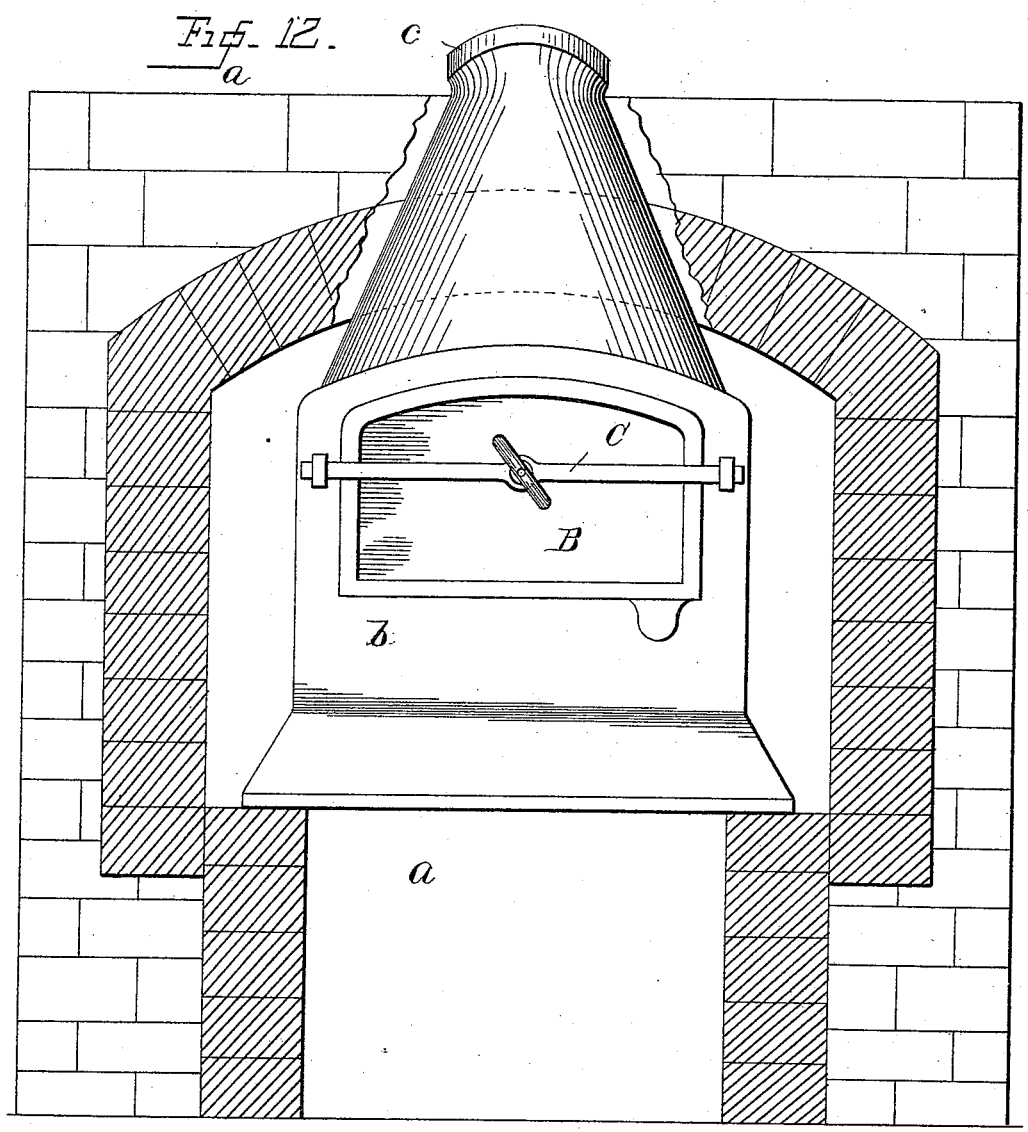
Figure 13:
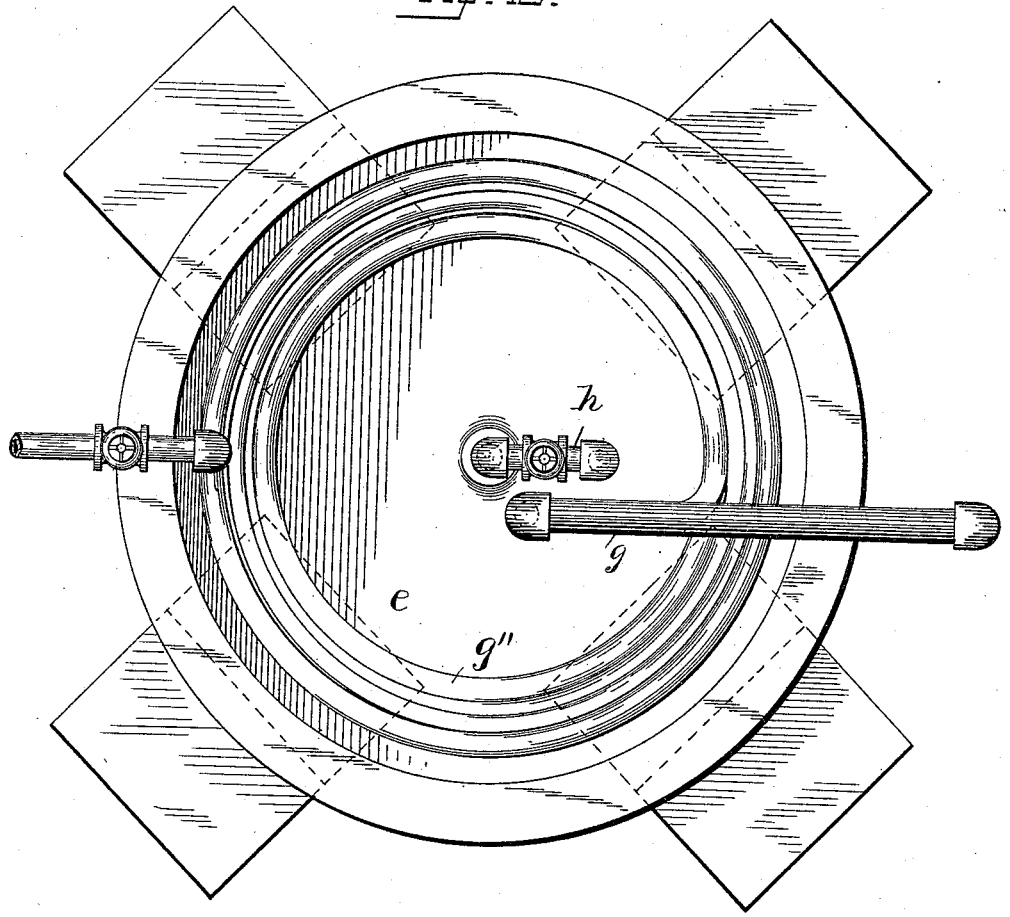

Figure 1 is a plan view on a comparatively small scale, shown partly dotted and mostly only in outline, of the plant or apparatus. It sets forth the general relative position of the various parts of the plants, especially when taken in combination with Figs. 2, 3, and 4. Fig. 2 is a view of so much of the plant as will appear on one side, partly in vertical elevation and partly in vertical section. Fig. 3 is a view at right angles in a horizontal plane of Fig. 2, the furnace being shown in section and certain parts which are behind other parts being shown dotted. Fig. 4 is a vertical section of the parts, slightly rearranged so as to show the connections or passage-ways from one part of the apparatus or plant to another, some of the parts—such as the retort, condenser, and preliminary crucible or boiler—being shown externally, while their supports formed of mason-work are shown in section. The plane of the section of the upper or preliminary crucible shown in the upper left-hand corner of Fig. 4 is parallel to but not coincident with the plane of the section of the remaining part of the figure. Fig. 5 sets forth, partly in vertical section, the fuser or preliminary melting apparatus for turning the solid sulphur into a liquid at about 200° centigrade. The figure represents particularly the tubular connection with the melting apparatus. Fig. 6 is a vertical elevation, partly in section, of the condenser, which is also a preliminary receiver for the flowers of sulphur. The tubular connections thereto are shown in part. Fig. 7 is a side view of a detail shown in Fig. 6. Fig. 8 is a sectional view of a portion of a detail shown in Fig. 6 on an enlarged scale. Fig. 9 is a plan view of the complete device shown in Fig. 6, the nozzle shown in Fig. 7 being omitted in Fig. 9. Figs. 10 and 11 show the retort on an enlarged scale, the former partly in section as to the furnace for the retort, and in both figures a portion of the side and top of the retort being broken out. The nozzle for the entrance of the melted sulphur and that for the exit of the vapor are shown in both figures. Fig. 12 is an end view of the door end of the retort, the furnace surrounding the same being shown partly in section. Fig. 13 is a plan view of the device shown in Fig. 5.

In all the figures such portions of the tubes that would add nothing in the way of information as to the construction are broken off and removed.

As the drawings are not intended for working drawings, they are not made to any fixed scale, but are made with a view of most clearly illustrating the principles of the invention and of mechanical construction.

The plant or apparatus embodying my invention and for carrying out the method consists in all its details of the combination of a furnace $a$, containing the main part or body of a retort $b$, which is provided with a neck $c$ or nozzle projecting from the furnace; a crucible $e$, located above but not directly over said retort; a steam-boiler $f$, having an exit steam-pipe $g$, provided with a regulating-valve $g'$ and forming a worm or spiral within the crucible $e$, said spiral being lettered $g''$, and the pipe $g$, after entering said crucible, passing out from the same and lengthwise around an independent tube or pipe $h$, which passes from and communicates with the interior of the crucible $e$ at its lower portion and connects with the feeding-nozzle $i$ of the retort $b$, the said pipe $g$ forming a steam-casing around said pipe $h$, Fig. 5, for the purpose hereinafter described; a valve $h'$ for the pipe $h$, which is in the form of a siphon inside of the crucible, the valve being located in the bend of the siphon; a condenser $j$, as completely as possible surrounded by a cold-water jacket $m$, whose entrance or feed is by the tube $m'$ at the upper part, and exit or outlet for the water or oil or similar cooling liquid is by the pipe $m''$; an air compressor or pump $n$, adapted to force air into the reservoir $o$; a tube or pipe $p$, one end of which opens in the extreme lower part of the condenser $j$ and the other end in the reservoir $o$, and which is provided with a regulating-valve $p'$, whereby air under pressure may be forced through and form a draft or suction in the retort and condenser for the purpose and in the manner hereinafter more particularly pointed out; a condenser-nozzle $j'$, opening from the upper part of said condenser and communicating with the neck $c$ of the retort; an outlet $q$, passing under the ground and out again into a compound receiver having two chambers $r$ and $r'$ and at the top a deflector $s$, movable from one side in the opening of the pipe $q$ to the opposite side, and other details now to be described. The pipe $p$ enters at the extreme upper part of the condenser $j$, while its lower end is so directed that the air exiting passes directly into the outlet $q$.

An opening is made in the upper part of the condenser $j$ and jacket $m$ and provided with a cover $t$, whereby the condenser may be cleaned whenever necessary. This cover (shown in part in Fig. 8) is preferably made of wood $t'$, covered by lead sheathing $t''$, Fig. 8. The jacket or casing $m$ surrounds all the upper part of the condenser, except, of course, at those places occupied by the nozzle $j'$, cover $t$, and pipe $p$, and the lower portion so far as is necessary to effect a complete cooling and condensation of the melted sulphur which enters at the nozzle $j'$. It is sufficient usually to have it extend about seven-eighths of the distance, measured from the top. The casing and condenser are supported by means of rings $u$, having annular projections $u'$, the said rings surrounding the casing and the projections resting upon corresponding edges of a brick foundation $v$. A branch $g'''$ of the pipe $g$ extends upward from the latter, so as to surround the pipe $h$ as it comes out of the crucible $e$, and with another branch $g''''$, which extends from the pipe $g$ to the nozzle $i$ in the retort. The former branch may be seen in Fig. 5, and both branches $g'''$ and $g''''$ in Fig. 4.

The operation is as follows: The solid sulphur in lumps is intermittently fed into the crucible $e$, while steam is admitted through the valve $g'$, Fig. 5, into the coil or spiral $g''$ and allowed to pass out through the valve G, which is in the pipe $g$ and shown in Fig. 2. The temperature of the steam, or, rather, of the sulphur, is raised to such a degree that the same melts into a limpid liquid. A cover is provided for the crucible, (lettered E and seen in Fig. 1.) The cover may be removed at any time during the operation and melted sulphur maintained in the crucible. The depth of the sulphur at first should be such that the latter overflows the siphon part or inverted U of the pipe $h$, and after that the level of the sulphur should not be allowed to get below the mouth $h''$ of the tube $h$. The liquid or melted sulphur enters the mouth $h''$, flows through the tube $h$ and valve $h'$ and through the nozzle $i$ into the interior of the retort $b$, which is so hot as to make the sulphur boil and vapor to pass through the neck $c$, through the nozzle $j'$ into the condenser $j$, where it becomes converted into a fine powder commercially known as "flowers of sulphur," which gradually falls to the bottom of the condenser, but which does not remain there, but passes off through the pipe $q$ with great rapidity on account of the air issuing from the pipe $p$ under pressure. This current of air produces a suction, which assists in the ebullition of the sulphur in the retort $b$. The current of air forces the flowers of sulphur through the pipe $q$, which enters the bottom of the compound chamber having sides which slope toward each other and toward the tube $q$. The deflector $s$, if located at the right, as shown in Fig. 2, directs the sulphur into the left-hand part of said chamber, from which it may be removed through the door R, and while being removed the deflector $s$ is pulled to the left, so that the sulphur is directed into the right-hand part of said chamber, from which it may be removed by the door R'. The pressure of the air in the reservoir $o$ is maintained at a much higher pressure than is needed at the mouth P of the pipe $p$, the pressure at said mouth being regulated by the valve P'. Never should the pressure at the mouth P be less than the pressure of the atmosphere, or else the latter will prevent the motion of the sulphur through the pipe $q$ from the condenser $j$ to the receiver or compound chamber $r$. In fact, the pressure should be so great that it is impossible for any clogging or stopping up of the pipe $q$. A pressure of from one-half to two atmospheres is sufficient for a moderately small plant. Cold water or similar fluid may be passed through the pipe $m'$ into the jacket $m$ continuously, so as to produce rapid condensation of the sulphur-vapor, so as to lower its temperature below the point of ignition before it reaches the mouth P; otherwise it would be partially converted into an oxide. The air rushing through the pipe $p$, being cold, assists greatly in condensing the sulphur-vapor. The branches $g'''$ and $g''''$, leading from the crucible to the retort, receive heat from the steam and prevent the sulphur from solidifying during its passage between the two main elements. If for any reason it is desired to stop the production of the flowers of sulphur, the valve $h'$ may be closed, whereby the liquid sulphur is prevented from entering the retort; or the valves $v'$ may be closed, whereby the sulphur will solidify and will not enter the mouth $h''$. If during the operation of the plant the crucible or any of its parts should become broken or otherwise impaired, or if the rate of manufacture is to be increased while the crucible cannot accommodate this rate, then some solid sulphur may be entered into the retort $b$ through the door B, which is provided at the left hand of the retort and clearly seen in Fig. 12, the said door being provided with a bar C, whereby the door is maintained when closed practically air-tight.

From the nature of the plant which has been described it is evident that when the production is once started it need not theoretically be stopped, as long as any solid sulphur is left with which to feed the crucible $e$. Practically it need not be stopped more than once a month, within which time on an average some part of the apparatus may become broken or out of order.

The deflector $s$ is provided with a handle S, by which the former may be manipulated from without the receiver.

It is unnecessary to go into the detail construction and operation of the air-compressor $n$, as the same is represented typically in the drawings, and may be of any type known in the art suitable for producing comparatively high pressure. It may be stated, however, that it is not recommended to use what is called a "blower," as sufficiently high pressure cannot be obtained thereby.

I claim as my invention—

1. In an apparatus for the manufacture of flowers of sulphur, the combination of a crucible, a steam-pipe passing through the same, a siphon having one end opening into the lower part of said crucible and the other end—that is, the longer end—opening into a retort $b$, steam pipes or jackets $g'''$ and $g''''$, surrounding said siphon between said crucible and said retort, and valves located in said steam-pipes and said siphon.

2. Apparatus for the manufacture of flowers of sulphur, consisting of the combination of a crucible, a steam-pipe passing through the same, a siphon having one end opening into the lower part of said crucible and the other end—that is, the longer end—opening into a retort $b$, steam pipes or jackets $g'''$ and $g''''$, surrounding said siphon between said crucible and said retort, a condenser into which the neck of said retort enters, a jacket connected with a cold-water or similar cool-liquid supply and surrounding said condenser, except as to its lower portion, a reservoir containing air under pressure and connecting by a pipe which passes through from the top to the lower part of said condenser and which opens at said lower part, means, such as a valve, for regulating the pressure of the air in said pipe, a receiver constructed in two parts, a pipe connecting the upper portion of the receiver with the lower portion of said condenser, and a deflector $s$, movable from one side to the other of the opening of that end of said pipe which is in the receiver.

3. Apparatus for the manufacture of flowers of sulphur, consisting of the combination of a crucible, a steam-pipe passing through the same, a siphon having one end opening into the lower part of said crucible and the other end—that is, the longer end—opening into a retort $b$, steam pipes or jackets $g'''$ and $g''''$, surrounding said siphon between said crucible and said retort, a condenser into which the neck of said retort enters, a jacket connected with a cold-water or similar cool-liquid supply and surrounding said condenser, except as to its lower portion, a reservoir containing air under pressure and connecting by a pipe which passes through from the top to the lower part of said condenser and which opens at said lower part, means, such as a valve, for regulating the pressure of the air in said pipe, and a receiver connected with the lower part of said condenser.

4. The hereinbefore-described method of manufacturing flowers of sulphur from solid sulphur, consisting in melting the sulphur without boiling the same, removing a portion of the melted sulphur, and while it is still in a melted condition boiling the same under a pressure less than that of the atmosphere, condensing successive portions of the vapor produced, and forcing by air under pressure the condensed sulphur to a distant point from that at which it is condensed.

In testimony that I claim the foregoing as my invention I have signed my name, in presence of two witnesses, this 6th day of March, 1890.

EDWARD F. WHITE.

Witnesses:
EDWARD P. THOMPSON,
E. G. DUVALL, Jr.